United States Patent Office 3,575,863
Patented Apr. 20, 1971

3,575,863
PHENOXYPHENOXYBIPHENYL COMPOUNDS
AND COMPOSITIONS
William C. Hammann, Creve Coeur, and Robert M. Schisla, Kirkwood, Mo., assignors to Monsanto Company, St. Louis, Mo.
No Drawing. Application Apr. 28, 1967, Ser. No. 634,446, now Patent No. 3,471,574, which is a continuation-in-part of application Ser. No. 310,457, Sept. 20, 1963. Divided and this application Apr. 21, 1969, Ser. No. 832,531
Int. Cl. C09k 3/00, 3/02
U.S. Cl. 252—73                 2 Claims

ABSTRACT OF THE DISCLOSURE

Compounds of classes represented by 3-(m-phenoxyphenoxy)biphenyl and 3 - (p - phenoxyphenoxy)biphenyl which exhibit liquid properties over a wide range and compositions containing said liquid compounds together with other fluids representative of which are polyphenyl ethers and phenoxybiphenyl compounds. The compounds and compositions have many uses among which are the use as a hydraulic fluid and heat transfer fluid.

---

This application is a division of application Ser. No. 634,446, filed Apr. 28, 1967, now Pat. No. 3,471,574, which in turn is a continuation in part of application Ser. No. 310,457, filed Sept. 20, 1963, now U.S. Pat. 3,406.207.

This invention relates to certain new phenoxyphenoxybiphenyl compounds, compositions of phenoxyphenoxybiphenyl compounds and the use of said compounds and compositions as functional fluids.

Many different types of materials are utilized as functional fluids and functional fluids are used in many different types of applications. Such fluids have been used as electronic coolants, atomic reactor coolants, diffusion pump fluids, synthetic lubricants, damping fluids, bases for greases, force transmission fluids (hydraulic fluids), heat transfer fluids, die casting release agents in metal extrusion processes and as filter mediums for air conditioning systems. Because of the wide variety of applications and the varied conditions under which functional fluids are utilized, the properties desired in a good functional fluid necessarily vary with the particular application in which it is to be utilized with each individual application requiring a functional fluid having a specific class of properties.

Of the foregoing the use of functional fluids as heat transfer fluids and hydraulic fluids, particularly aircraft hydraulic fluids, has posed what is probably the most difficult areas of application. Thus, the requirements of a heat transfer fluid are as follows: The fluid should be liquid over a wide temperature range, and in general have a low vapor pressure so as to be utilized at atmospheric pressure. Such fluid should be operable as a heat transfer media over an extended period of time at given temperatures and should in addition be non-flammable, non-toxic and exhibit a high degree of thermal and hydrolytic stability. Thus, a heat transfer fluid is often required to operate at temperatures in the order of 800° F. or higher over extended periods of time. Such fluids, in addition, should be non-corrosive to metals within which said fluids are in contact and in particular such fluids should be non-corrosive at the operating temperature at which said fluid is functioning as a heat transfer fluid. It is of particular importance that when said fluid is used as a heat transfer fluid, that the fluid not react with metals in contact with the fluid.

The requirements for an aircraft hydraulic fluid can be described as follows: The hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly non-flammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, etc. employed in the hydraulic systems of aircraft which are exceedingly severe on the fluid used. It should be thermally and chemically stable in order to resist oxidation and decomposition so that it will remain uniform under conditions of use and be able to resist the loss of desired characteristics due to high and sudden changes of pressure and temperature, high shearing stresses, and contact with various metals which may be, for example, aluminum, bronze, copper and steel. It should also not deteriorate the gaskets or packings of the hydraulic system. It must not adversely affect the materials of which the system is constructed, and in the event of a leak, should not adversely affect the various parts of the airplane with which it may accidentally come in contact, such as electrical wire insulation and paint. It should not be toxic or harmful to personnel who may come in contact with it.

It is, therefore, an object of this invention to provide compounds which have a wide liquid range. It is a further object of this invention to provide fluids which have utility as functional fluids, particularly aircraft hydraulic fluids and heat transfer fluids.

It has now been found that functional fluids which have excellent physical properties and which are particularly suitable for use as heat transfer fluids are obtained through the use of phenoxyphenoxybiphenyl compounds selected from 3-(m-phenoxyphenoxy)biphenyl, 3-(p-phenoxyphenoxy)biphenyl and mixtures thereof.

Of the nine possible phenoxyphenoxybiphenyls, only two isomers have suitable physical properties to provide the desired wide liquid range necessary for use as a functional fluid. The suitable isomers of phenoxyphenoxybiphenyl having fluid properties at room temperature are 3-(m-phenoxyphenoxy)biphenyl and 3 - (p - phenoxyphenoxybiphenyl). All of the other possible isomers of phenoxyphenoxybiphenyl are crystalline solids at room temperature having melting points ranging from about 124° F. to 271° F., i.e., the crystalline solid phenoxyphenoxybiphenyls have a melting point of the order of at least about 80° F. above that of the specific class of liquid phenoxyphenoxybiphenyls. The melting points of the phenoxyphenoxybiphenyls which are not fluids at normal room temperatures are given below:

| Isomer: | Melting point, ° F. |
|---|---|
| 2-(o-phenoxyphenoxy)biphenyl | 152 |
| 2-(m-phenoxyphenoxy)biphenyl | 124 |
| 2-(p-phenoxyphenoxy)biphenyl | 185 |
| 3-(o-phenoxyphenoxy)biphenyl | 144 |
| 4-(o-phenoxyphenoxy)biphenyl | 252 |
| 4-(m-phenoxyphenoxy)biphenyl | 131 |
| 4-(p-phenoxyphenoxy)biphenyl | 269 |

As is readily apparent from the aforedescribed phenoxyphenoxybiphenyl compounds, there are only two compounds which are liquids at ambient temperature whereas the remaining phenoxyphenoxybiphenyl isomers are all solids at ambient temperature. In particular, the above table demonstrates that there is no way of predicting liquid properties among the various isomers of phenoxyphenoxybiphenyl.

The liquid phenoxyphenoxybiphenyl compounds are particularly useful as thermally stable functional fluids especially heat transfer fluids due to their wide liquid range and high thermal stability. In addition, the liquid phenoxyphenoxybiphenyl compounds either singularly or as mixtures can be blended together with other compounds such as bisphenoxybiphenyl compounds, bisphenoxyphenoxybiphenyl compounds and analogs thereof as well as blended together with polyphenyl ethers and polyphenyl thioethers.

The liquid phenoxyphenoxybiphenyl compounds and compositions with polyphenyl ethers have been found to be especially good functional fluid compositions having high thermal stability, high oxidative stability, high hydrolytic stability, low pour points, low vapor pressure at elevated temperatures, wide liquid range, good viscosity characteristics, good lubricating properties, extended useful life at elevated temperatures and substantially no corrosion of metal mechanical members in contact with the phenoxyphenoxybiphenyl compounds of this invention. The functional fluids of this invention are particularly useful as inexpensive high-temperature heat transfer fluids. Such compositions are also useful as high-vacuum diffusion pump oils; lubricants and heat transfer fluids in jet engines, including stationary jet power units, other type engines, and missiles; heat transfer and dielectric fluids for electronic apparatus and other electrical equipment, such as high-voltage transformers, etc.; hydraulic fluids for supersonic aircraft and missiles; coolant-moderators for nuclear reactors; etc.

Typical examples of bisphenoxybiphenyl compounds which can be blended with the phenoxyphenoxybiphenyl compounds are 2,3'-, 3,3'-, 3,4'-, and 3,4-bisphenoxybiphenyls.

Typical examples of polyphenyl ether compounds which can be blended together with the liquid phenoxyphenoxybiphenyl compounds are bis(phenoxyphenyl) ethers, e.g., bis(m-phenoxyphenyl) ether, the bis(phenoxyphenoxy)benzenes, e.g., m-bis(m-phenoxyphenoxy)benzene, m-bis(p-phenoxyphenoxy)benzene, o-bis(o-phenoxyphenoxy)benzene, the bis(phenoxyphenoxyphenyl) ethers, e.g., bis-[m - (m-phenoxyphenoxy)phenyl] ethers, bis[p-(p-phenoxyphenoxy)phenyl] ethers, m-[(m - phenoxyphenoxy)(o-phenoxyphenoxy)] ether and the bis(phenoxyphenoxyphenoxy)benzenes, e.g., m - bis[m - (m-phenoxyphenoxy)phenoxy]benzene, p-bis[p-(m-phenoxyphenoxy)phenoxy]benzene, m - bis[m-(p-phenoxyphenoxy)phenoxy]benzene and mixtures thereof with other polyphenyl ethers.

The individual liquid phenoxyphenoxybiphenyls can be prepared by the condensation reaction of 3-halobiphenyl with either m-phenoxyphenol or p-phenoxyphenol as the alkali metal phenate over a temperature range of from about 175° C. to about 225° C., preferably from about 175° C. to about 210° C. for a period of time of about 1 to about 16 hours or longer. Said condensation reactions are carried out in the presence of a copper catalyst which can be powdered metallic copper, copper hydroxides, a copper salt such as cuprous chloride, cupric chloride, etc., or mixtures thereof. Whereas the exact quantity of the copper catalyst is not critical, amounts of the order of about 1 to about 6 mole percent of copper, based on the total mole equivalence of the halogen groups of the 3-halobiphenyl, have been found to be satisfactory. However, it will be understood that smaller and larger amounts of catalysts can be employed as desired.

After the 3-halobiphenyl has been reacted with the potassium phenoxy phenate at the stated temperatures for from about 1 to several hours, the reaction mixture is cooled and poured into a dilute aqueous caustic solution and extracted with a number of portions of inert solvent, such as benzene, toluene, xylene, carbon tetrachloride, and the like, whereby the aqueous phase removes the potassium halide salt from the system. The combined organic phase is then preferably washed with several portions of dilute potassium hydroxide solutions followed by several washings with water alone, and then the organic phase is dried over a desiccant such as anhydrous magnesium sulfate, filtered, and the organic solvent removed by distillation, whereby the phenoxyphenoxybiphenyl compound is retained in the distillation vessel. The reaction product can then be distilled through a Vigreux column to obtain a fluid phenoxyphenoxybiphenyl compound, per se.

It also will be understood that the phenoxyphenoxybiphenyl compounds of the instant invention can be treated with active charcoal, Attapulgus earth, and/or alumina, preferably by filtering the hot reaction mixture, or a solution thereof, through a column of such material, whereby various color bodies are removed or substantially reduced. It will also be understood that such treatment can also be carried out by mixing any of the aforesaid materials with the phenoxyphenoxybiphenyl compound or compositions, preferably at a temperature of from about 50 to about 100° C. and maintaining the charcoal, Attapulgus earth, and/or alumina in a suspended state by mild agitation and subsequently filtering the reaction mixture while still warm. The phenoxyphenoxybiphenyl compounds also can be taken up in an organic solvent such as benzene, and the organic solution treated with the aforesaid materials, filtered, and the organic solvent removed by distillation under reduced pressure.

The preferred halogen has been found to be either chloro or bromo with chloro being the most preferred. Thus, it is preferred to use, for example, 3-chlorobiphenyl as the starting reactant in preparing the liquid phenoxyphenoxybiphenyl compounds. In addition, it is contemplated within the scope of this invention that mixtures of phenoxyphenoxybiphenyl compounds can be prepared such as when a mixture of p-phenoxyphenol and m-phenoxyphenol is interacted with, for example, 3-chlorobiphenyl. In preparing the mixture of phenoxyphenoxybiphenyls, the same process conditions are utilized as used in the preparation of the pure liquid phenoxyphenoxybiphenyl compounds.

The invention can be better appreciated by the following non-limiting examples.

EXAMPLE 1

To a 500 ml. reaction flask equipped with addition funnel, stirring means, and thermometer was added 186 grams (1.0 mole) of m-phenoxyphenol, 28.0 grams (0.5 mole) of potassium hydroxide and 50 ml. of toluene. After the water had been azeotropically taken off, the reaction mixture was heated to 170° C. to remove the toluene. The temperature was increased to 190° C. and cupric chloride (5 grams) was added at periodical intervals while 3-chlorobiphenyl, 28 grams (0.149 mole) was added over a 30-minute period. The temperature was maintained at 200° C. for a period of 12 hours. The temperature was allowed to reach ambient temperature and the reaction mixture diluted with benzene and an aqueous solution of 3 N potassium hydroxide. The organic layer was washed with the potassium hydroxide solution followed by water washes and dried over magnesium sulfate. The benzene was removed from the product and the product was distilled. Vacuum distillation of the product yielded 3-(m-phenoxyphenoxy)biphenyl at a boiling point of 212° C./0.4 mm. The compound 3-(m-phenoxyphenoxy)biphenyl at a percent carbon of 85.01, a percent hydrogen of 5.36, a chlorine content less than 0.01 and a $n_D^{25}$ of 1.6414, and had a thermal decomposition point of 824° F.

EXAMPLE 2

Following the procedure of Example 1 potassium p-phenoxyphenate was prepared from p-phenoxyphenyl (80 grams, 0.43 mole) and potassium hydroxide (22.4 grams, 0.4 mole) in 50 ml. of toluene by azeotropically removing the water. 5 grams of cupric chloride was added followed by the addition of 3-chlorobiphenyl (51.5 grams, 0.274 mole) over a 30-minute period. The reaction mixture was stirred for 6 hours at 210° C. and after washing with 3 N potassium hydroxide solution followed by water washings, the product, 3-(p-phenoxyphenoxy)biphenyl, was vacuum distilled. The compound had a boiling point of 218° C., at 0.1 mm., a percent carbon of 85.12, a percent hydrogen of 5.63, a percent chlorine less than 0.01 and a $n_D{}^{25}$ of 1.6428. The compound was liquid at ambient temperature and had a thermal decomposition point of 827.6° F.

EXAMPLE 3

Utilizing the procedure of Example 1, a mixture of phenoxyphenoxybiphenyl compounds is prepared by the interaction of 3-chlorobiphenyl in the presence of a cupric chloride catalyst with an 80/20 weight percent mixture of potassium m-phenoxy phenate and potassium p-phenoxy phenate at a temperature of about 210° C. for a period of 10 hours. The product obtained is a mixture of 3-(m-phenoxyphenoxy)biphenyl and 3-(p-phenoxyphenoxy)biphenyl. The mixture was liquid at ambient temperature.

As is seen from the foregoing properties of the liquid phenoxyphenoxybiphenyl compounds, the liquid compounds have a wide liquid range in the order of 700° F. In addition to the wide liquid range, the compounds and compositions incorporating the liquid phenoxyphenoxybiphenyl compounds are shear stable and not prone to foam formation. Furthermore, the claimed compounds and compositions have good stability, even at temperatures in the order of 800° F. or higher and in the presence of oxygen, and are essentially non-corrosive to metals, such as aluminum, bronze, iron, silver and titanium. A further advantage of the instant compounds and compositions are their outstanding hydrolytic stability.

As a result of the excellent physical properties of the compound of this invention and mixtures thereof, heat transfer systems can be developed wherein a liquid heat exchange medium is utilized to transfer heat to another body wherein said body is maintained at a predetermined temperature. In particular, the liquid phenoxyphenoxybiphenyls and the phenoxyphenoxybiphenyl compositions have been found to be excellent heat exchange mediums due to their wide liquid range.

As a result of the excellent physical properties of the compounds particularly described in the preceding examples, improved hydraulic pressure devices can be prepared in accordance with this invention which comprise in combination a fluid chamber and an actuating fluid in said chamber, said fluid comprising a compound hereinbefore described. In such a hydraulic apparatus wherein a movable member is actuated by the above-described functional fluids, performance characteristics are obtainable which are superior to those heretofore obtainable.

Because of the excellent fire-resistance of the compounds and compositions of this invention, their exceptionally wide liquid range and good lubricating properties, the compounds of this invention can be utilized in those hydraulic systems wherein power must be transmitted and the frictional parts of the system lubricated by the hydraulic fluid utilized. Thus, the novel compounds and compositions of this invention find utility in the transmission of power in a hydraulic system having a pump therein supplying the power for the system. In such a system, the parts which are so lubricated include the frictional surfaces of the source of power, namely the pump, valves, operating pistons and cylinders, fluid motors, and in some cases, for machine tools, the ways, tables and slides. The hydraulic system may be of either the constant-volume or the variable volume type of system.

The pumps may be of various types, including the piston-type pump, more particularly the variable-stroke piston pump, the variable-discharge or variable displacement piston pnmp, radial-piston pump, axial-piston pump, in which a pivoted cylinder block is adjusted at various angles with the piston assembly, for example, the Vickers axial-piston pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

The compounds and compositions of this invention when utilized as a functional fluid can also contain dyes, pour point depressants, antioxidants, defoamers and lubricity agents, such as diisopropyl hydrogen phosphite and the like.

In addition, the compounds and compositions of this invention when utilized as functional fluids can also contain viscosity index improvers, such as polyalkylmethacrylates, polyalkylacrylates, polymethanes, polyesters and polyalkylene oxides. The viscosity index improver is generally present in a concentration sufficient to alter the viscosity characteristics of the fluid of this invention and is generally present in a concentration of from about 0.50% to about 25%.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. In a method of transferring heat between a body of material and a heat exchange medium which comprises passing a liquid heat exchange medium into heat exchange relationship with said body of material, the improvement comprising employing as said heat exchange medium a liquid consisting essentially of a phenoxyphenoxybiphenyl compound selected from the group consisting of 3-(m-phenoxyphenoxy) - biphenyl, 3 - (p-phenoxyphenoxy)biphenyl, and mixtures thereof.

2. In a method of operating a hydraulic pressure device wherein a displaceable force is transmitted to a displaceable member by means of a hydraulic fluid, the improvement which consists essentially of employing as said fluid a phenoxyphenoxy biphenyl compound selected from the group consisting of 3-(m-phenoxyphenoxy)biphenyl, 3-(p-phenoxyphenoxy)biphenyl, and mixture thereof.

References Cited

UNITED STATES PATENTS 3,081,355    3/1963    Johnson _____ 260—613

HERBERT B. GUYNN, Primary Examiner

D. SILVERSTEIN, Assistant Examiner

U.S. Cl. X.R.

260—613